Figure 1:
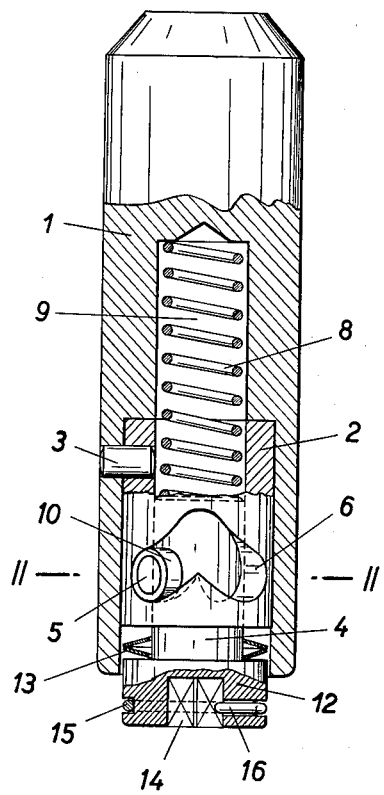

Sept. 18, 1962      H. ZENGERER      3,054,312

ROTARY-IMPACT TYPE HAND TOOL

Filed Jan. 31, 1961

Inventor
Hans Zengerer
By
Watson, Cole, Grindle & Watson
Attys.

United States Patent Office
3,054,312
Patented Sept. 18, 1962

3,054,312
ROTARY-IMPACT TYPE HAND TOOL
Hans Zengerer, Wildon, Stmk., Austria
Filed Jan. 31, 1961, Ser. No. 86,058
Claims priority, application Austria Feb. 2, 1960
3 Claims. (Cl. 81—52.3)

The invention relates to a device for tightening and loosening screws, bolts, nuts and the like, comprising a hollow stem, inside which a swivel for the attachment of the tool is pivoted and axially movable against the action of a spring, said swivel being positively attached to a bolt radially extending through said swivel, the extremities of said bolt engaging in helical grooves, thereby coupling the swivel with the stem. The device is actuated by hammer blows striking against it in an axial direction, the machine element being rotated by jerks accompanied by a considerable amount of torque.

With the conventional types of this tool, the helical grooves in which the swivel bolt engages, are recessed in the walls of the hollow stem. Therefore, the stem must be made of a material capable of withstanding the hammer blows without breaking to pieces. According to practical experience the Rockwell C hardness must not exceed 50 to 52 degrees. However, with this hardness, the helical grooves are soon knocked out and worn with the result that the efficiency of the device diminishes and it becomes rather difficult to manipulate. In addition, the helical grooves are outwardly open and liable to cause accidents and also facilitate the penetration of foreign matter interfering with the smooth operation of the device and causing premature wear. In order to avoid at least these drawbacks, it has already been suggested to cover the area of the hollow shaft presenting the helical grooves with a sleeve to be put thereon from outside. However, this precaution fails to eliminate the first-mentioned shortcoming.

In connection with other devices of a similar nature, wherein the linear striking force is converted into a peripheral force by means of a swivel serving also as a tool-holder and presenting a threaded outer surface, it has already been suggested to design the part of the stem engaging in the thread as a chuck. This is inserted in the stem in such a manner that by the action of the blow being struck against the stem, the jaws of the chuck are forced apart by the thread of the tool-holder, thus producing a frictional connection between the chuck and the stem. The disadvantage of this arrangement resides in the fact that the stroke of the swivel in relation to the stem is limited by the impact of the upper front face of the swivel serving as a support for the return spring on a shoulder of the stem. Due to the smallness of the area available for the absorption of the swivel motion in relation to the stem, the shoulder of the stem will be deformed by blows of great force, such deformation being liable to cause the jamming of the return spring.

According to the present invention, the sleeve with the helical grooves is countersunk in a cylindrical and coaxial bore of the stem and presents a stroke-limiting shoulder for the extremity of the swivel protruding from the stem and constituting the tool-holder. This arrangement offers the advantage that for the selection of a suitable material for the manufacture of the stem such considerations as must otherwise be given to the contact pressure in the grooves may be disregarded. Consequently, while the stem will be produced of a tough and shatterproof alloy, the sleeve with the helical grooves will be manufactured of an exceedingly hard material. The sleeve consisting of a particularly wear-resistant material also serves to absorb the forces originating from the yielding of the swivel following the loosening of the screw or bolt or prior to their tightening, when the said swivel impinges on the stem. The Rockwell C hardness of the sleeve material may vary between 60 and 62. In addition to a high degree of resistance to wear, a further advantage resides in the fact that the cost of manufacturing the sleeve is reduced due to the fact that the helical grooves can be mortised more easily into the small cylindrical sleeve than into the much larger stem. The helical grooves are completely covered outwardly by the stem enclosing the sleeve and the outer surface of the stem holding the device is absolutely smooth. Lastly, the sleeve presenting the helical grooves is exchangeable.

According to another feature of the invention, the swivel-stroke limiting shoulder is provided with an elastic body, preferably a cup-spring arranged coaxially with the swivel and located between the sleeve and the tool-holder, the height of said body in relaxed condition being less than the maximum swivel stroke. This arrangement eliminates the hard impact of the swivel at the end of the inward motion without, however, impeding the motion of the swivel in the first stage. This design of the elastic body likewise eliminates the drawbacks inherent in a known design where a sleeve mounted on the swivel, the upper edge of which closely slides on the cylindrical outer surface of the stem, whereas its lower extremity is tightly attached to the swivel, defines a chamber filled with air which during the motion of the swivel into the interior of the stem also acts as a spring. The sleeve sliding up and down the outer surface of the stem is liable to cause injuries and besides, the air spring force counteracting the motion of the swivel in relation to the stem takes effect from the beginning of the said motion, thereby weakening the impact force over the entire stroke. In addition, the change-over of the swivel as occurs with V-shaped grooves with their helical groove halves diverging in a downward direction toward the tool-holder during the transition from the tightening to the loosening operation is much more difficult to achieve with the conventional design featuring a counter-spring which is active from the beginning.

Figure 2:
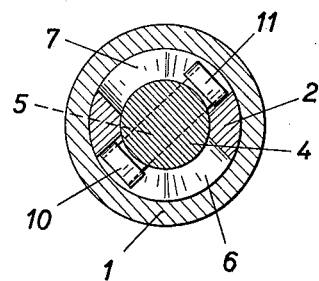

The accompanying drawing illustrates an example of an embodiment of the invention, wherein FIGURE 1 shows a longitudinal section of a device according to the invention and FIGURE 2 a cross-section of the same on line II—II of FIGURE 1.

A sleeve 2 of high-grade steel of very great hardness is inserted in the hollow stem 1 of the device, said sleeve being locked against axial displacement and rotation in relation to the stem 1 by means of a pin 3. Inside the sleeve 2 an axially displaceable swivel 4 is located and attached to said sleeve by means of a bolt 5 radially extending through the swivel 4 and engaging with its extremities in the helical grooves 6, 7 provided in the sleeve 2. A helical pressure spring 8 is arranged in coaxial relation to the swivel 4, one extremity of said spring resting in a bore 9 of the stem 1, whereas the other extremity is supported by the inner front face of the swivel 4. The spring 8 is pre-stressed and tends to squeeze the swivel 4 out of the stem 1.

Sleeves 10, 11 are slidingly arranged in a manner known per se on the extremities of the bolt 5 engaging in the helical grooves of the sleeve 2, said sleeves rolling over the curved surfaces of the helical grooves when the device is actuated, thereby reducing the sliding pressures between the bolt 5 and the helical grooves 6, 7.

The extremity of the swivel 4 protruding from the stem constitutes a tool-holder 12, its outside diameter being equal to the outside diameter of the sleeve 2, the distance between the tool-holder 12 and the opposite front face of the sleeve 2 being dimensioned in such a manner that the tool-holder 12 will limit the stroke of the swivel 4 during its inward motion into the stem 1 and come to lie against the sleeve 2 even before the bolt 5 strikes the upper vertex of the helical grooves 6, 7, a cup spring 13 being located between the tool-holder 12 and the sleeve 2 around the swivel 4, said cup spring elastically attenuating the impact of the tool-holder 12 upon the sleeve 2.

The tool-holder 12 presents a recess 14 to receive the square head of a tool. In order to prevent the tool from falling out of the tool-holder 12, a spring ring 15 presenting a radial extension 16 protruding into the recess 14 is inserted in a peripheral groove of the tool-holder 12. The extremity of the extension 16 is rounded off and engages in a cavity of the toolhead when the same is inserted in the recess 14. During the insertion and removal of the tool from the tool-holder 12 the extension 16 is displaced in a radial direction, thereby widening the spring ring 15.

When the hammer blow impinges upon the striking surface of the stem 1, the latter together with the sleeve 2 is moved downward in an axial direction, the helical grooves 6, 7 provided in said sleeve acting through the bolt 5 on the swivel 4 to jerk the same around. The sleeves 10, 11 located on the extremities of bolt 5 roll off on the upper limiting surfaces of the helical grooves 6, 7 until such time when the tool-holder 12 comes to lie against the lower front face of the sleeve 2 over the cup spring 13. As the effect of the hammer blow ceases, the swivel 4 is again pushed out of the stem 1 and the sleeve 2 into its initial position.

The helical grooves 6, 7 are V-shaped to permit turning the swivel in both directions. To reverse the direction it suffices to push the swivel 4 against the action of the spring 8 by hand into the sleeve 1 and to jerk it around until the bolt 5 has passed the vertex of the V-shaped helical grooves 6, 7. After releasing the swivel 4 or the stem 1 the bolt 5 now springs into the other extreme position of the helical grooves 6, 7, with the result that when the blow strikes the stem 1, the bolt 5 and consequently, the swivel 4 is jerked around in the opposite direction.

I claim:
1. A device for the tightening and loosening of screws, bolts, nuts and the like, comprising a hollow stem, a sleeve presenting helical grooves and positively and coaxially inserted in said hollow stem, a swivel engaging in said sleeve and rotatable in said sleeve and axially displaceable therein, a spring loading the said swivel in an axial direction, said swivel comprising a shank slidable in said sleeve and an enlarged portion on the free end of the shank protruding from said stem and constituting a tool-holder, the juncture of the shank and the tool holder defining a shoulder for the limitation of the swivel stroke and said swivel having a bolt projecting into the grooves.

2. A device as claimed in claim 1, wherein an elastic body is provided between said sleeve and the tool-holder constituted by the extremity of said swivel protruding from the stem and arranged in coaxial relation to the swivel, the height of said elastic body in relaxed condition being less than the maximum stroke of the swivel.

3. A device as claimed in claim 2, wherein the elastic body is designed as an annular cup spring.

References Cited in the file of this patent
UNITED STATES PATENTS

| | | |
|---|---|---|
| 2,010,616 | Walsh | Aug. 6, 1935 |
| 2,543,441 | Crummey | Feb. 27, 1951 |
| 2,631,484 | Spielman | Mar. 17, 1953 |
| 2,633,042 | Halverson | Mar. 31, 1953 |
| 2,635,497 | Spielman | Apr. 21, 1953 |
| 2,638,806 | Spielman | May 19, 1953 |

FOREIGN PATENTS

| | | |
|---|---|---|
| 212,784 | Austria | Jan. 10, 1961 |
| 682,567 | Great Britain | Nov. 12, 1952 |
| 1,215,014 | France | Nov. 16, 1959 |